United States Patent Office 3,154,733
Patented Oct. 27, 1964

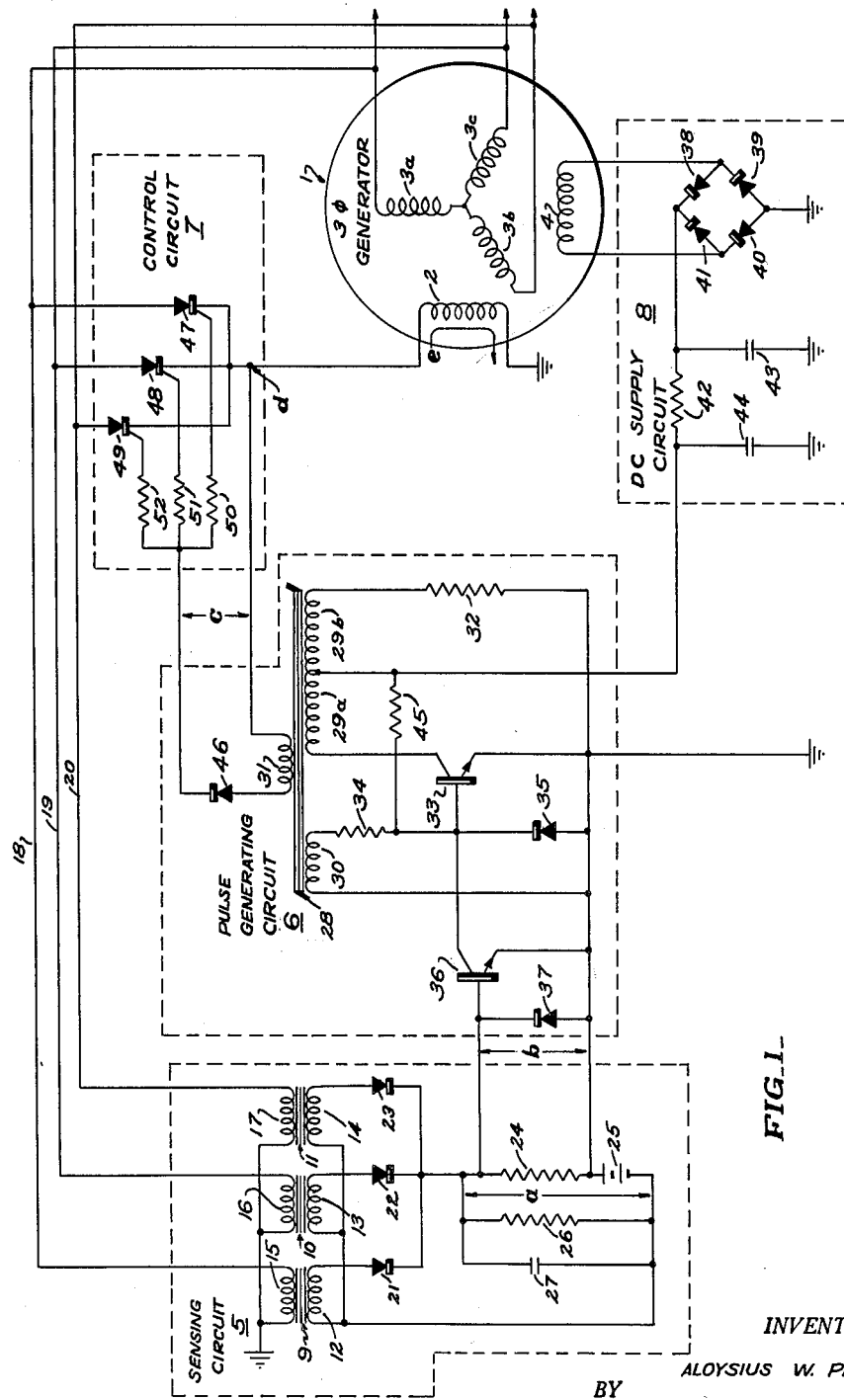

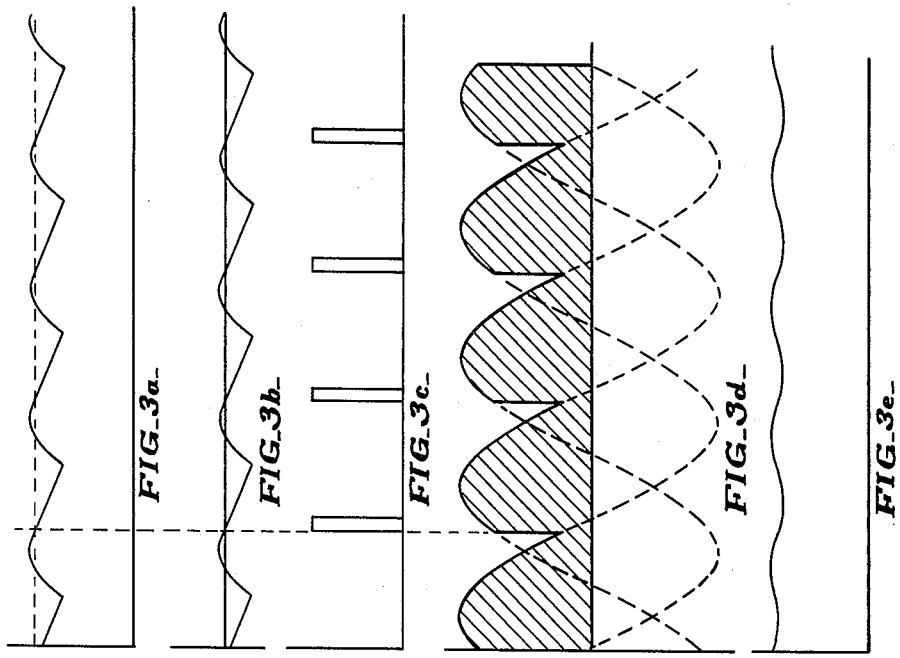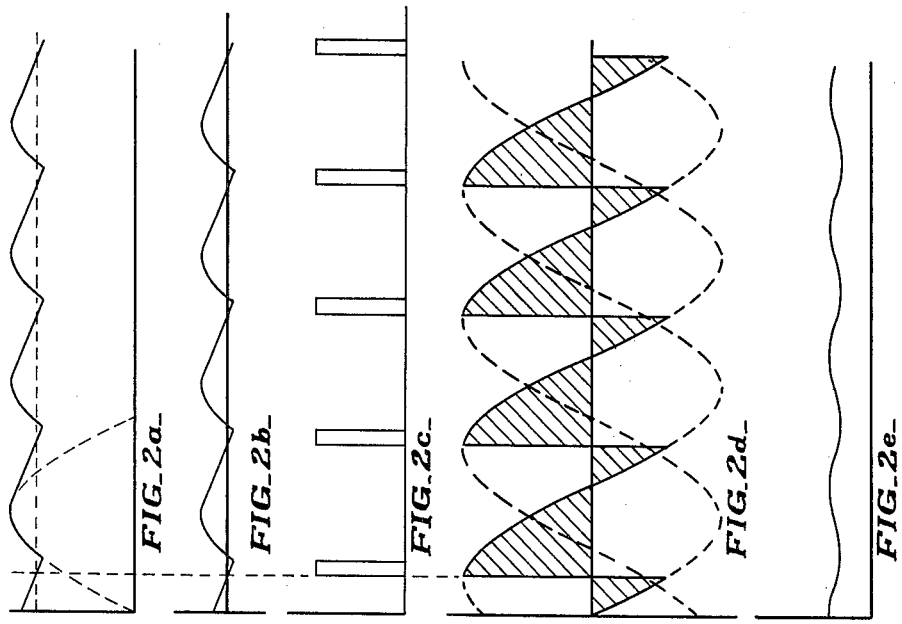

3,154,733
PULSE-TYPE REGULATING SYSTEM FOR
GENERATORS
Aloysius W. Pratt, New Carlisle, Ohio, assignor to American Machine & Foundry Company, a corporation of New Jersey
Filed Oct. 16, 1961, Ser. No. 145,311
6 Claims. (Cl. 322—28)

This invention relates to electrical generating equipment and more particularly to an improved pulse-type regulating system for use with electric generators to maintain a constant output potential regardless of operating conditions.

Some sort of regulator, commonly of the servo feedback loop type, is generally required to maintain the output potential of electrical generating equipment constant regardless of operating conditions. A servo feedback loop regulator senses the generator output potential and alters the energy supplied to the generator field winding to compensate for any deviation from a desired output level. Attainment of stability is a major problem in the design of such a system, particularly because of the number of appreciable time constants present in the servo loop. If the time constants cumulatively cause a considerable time delay between an output deviation and the correcting action, the system will tend to overcompensate since it continues to correct after the deviation has been eliminated. Such overcompensation results in an unstable system which develops a generator output potential which oscillates about the desired level.

On a practical basis, it is impossible to design an absolutely stable generator servo regulator system since the generator field winding, through which the regulator acts, is highly inductive and therefore always contributes a time constant. Most prior systems introduce additional time delay in the servo loop mainly as a result of the cumulative time constants of the components employed. For example, systems employing mechanically moving parts or saturable reactors have a considerable time delay because of the long time constants of these components. Vacuum tube circuits and solid state circuits are considerably faster but still often introduce additional time constants. These systems are made workable, however, by carefully limiting the feedback amplification so that the instability of the system is minimized to a tolerable level.

It is a general object of this invention to provide a servo regulator system, primarily for use with electrical generating equipment, which has no substantial time constant and is therefore inherently stable.

Another object is to provide an electrical generator regulating system wherein semi-conductor components are employed throughout to achieve a high measure of reliability. Such semi-conductor components, where employed, can be operated in their switching mode, in accordance with this invention, to further increase reliability and eliminate ambient temperature effects and direct current amplification problems.

Still another object is to devise such a regulator system capable of operation with a series of time positioned pulses to essentially eliminate time constants and increase system stability.

In copending application Serial No. 123,467, filed July 12, 1961, a system somewhat similar to the pulse control regulating system of this invention was described. In the pulse system of said copending application, control pulses of variable time duration were developed which in turn controlled the metering out of energy to the generator field winding in a manner to compensate for variations in the generator output potential. The present invention relates to another unique pulse control system which, instead of relying on the time duration of the control pulses, relies on the time position of the pulses. Here, a series of narrow pulses are generated which fire controlled rectifiers at the proper time to permit delivery of a proper amount of energy to the generator field winding. If the generator output tends to decrease, the pulses are advanced, firing the controlled rectifiers slightly earlier to thereby increase the energy supplied to the field winding and compensate for the decrease in output potential. Similarly, if the output potential increases, the pulses are retarded to decrease the energy supplied to the field winding, thereby decreasing the output potential. Thus, by properly positioning the pulses in time, the energy supplied to the generator field winding is controlled in closed servo loop fashion to compensate for any changes in the generator output potential.

In order that the manner in which the foregoing and other objects are attained in accordance with the invention can be understood in detail, reference is made to the accompanying drawings, which form a part of this specification, and wherein:

FIG. 1 is a schematic diagram of a generator regulating system in accordance with this invention;

FIGS. 2a–2e represent wave shapes of various potentials appearing when the regulating system operates in conjunction with high generator output potentials; and FIGS. 3a–3e represent wave shapes of various potentials appearing when the regulating system operates in conjunction with low generator output potentials.

The three-phase alternating current generator 1 being controlled, as shown in FIG. 1, can be of any conventional type and includes a field winding 2, three-phase output windings 3a, 3b and 3c, and a single-phase output winding 4. The field winding, on the one hand, and the output windings, on the other hand, rotate with respect to one another, either the field winding or the output windings being stationary. The windings are arranged so that the energy applied to field winding 2 is operative to control the magnitude of the potential developed by the output windings.

A sensing circuit 5 is connected across the generator output to derive a bipolar signal having an average value related to the generator output potential. This bipolar signal is developed by half-wave rectifying a portion of the negative half-cycle of the generator output to obtain a unipolar signal and then by adding a fixed reference potential to make the signal bipolar. The pulse generating circuit 6 develops an output pulse having a predetermined energy content whenever the circuit input signal changes polarity from plus to minus. Thus, whenever the bipolar signal developed by the sensing circuit changes polarity in the proper direction, a pulse is generated by the pulse generating circuit 6. The control circuit 7 is connected to permit energy to flow from the generator output to the field winding 2. The essential elements of the control circuit 7 are the controlled rectifiers which are operative in response to pulses from the pulse generator circuit 6. The entire system is arranged so that the pulses occur at the proper time to fire the controlled rectifiers at the correct time to permit the desired amount of energy to flow through field winding 2.

Servo feedback control is achieved in this system by varying the time position of the control pulses developed by pulse generating circuit 6. If the generator output tends to increase, the average value of the bipolar signal increases and therefore the bipolar signal changes from positive to negative at a later point in time, causing the pulse developed by pulse generating circuit 6 to occur at a later point in time. Therefore, less energy flows through the controlled rectifiers of control circuit 7, decreasing the energy supplied to the field winding 2 thereby tending to decrease the generator output potential.

Similarly, if the generator output potential tends to decrease, the average value of the bipolar signal decreases, causing the pulse to be developed earlier in time, permitting more energy to pass through the controlled rectifiers to increase the energy supplied to field winding 2, thereby tending to increase the generator output potential.

Sensing circuit 5 includes transformers 9, 10 and 11 having, respectively, secondary windings 12, 13 and 14 and primary windings 15, 16 and 17 Y-connected to the three-phase generator output via conductors 18, 19 and 20. Secondary windings 12, 13 and 14 are Y-connected to the anodes of diodes 21, 22 and 23, respectively. The series combination of resistance 24 and battery 25, and the parallel combination of resistance 26 and capacitance 27, are connected between the common anode connection of the diodes and the common Y-connection of the secondary windings.

The three-phase half-wave rectified potential is unipolar, i.e., the signal varies in magnitude but does not change polarity, and is positive at the common anode junction with respect to the common secondary winding junction. The unipolar signal is obtained from the negative portion of the generator output signal because of the 180° phase inversion inherent in transformers such as transformers 9–11. The unipolar signal $a$ appearing across the series combination of resistance 24 and battery 25 is modified somewhat because of the filtering action of capacitance 27. Battery 25 opposes the unipolar signal $a$ and is of the proper value to convert the unipolar signal into a bipolar signal $b$. In actual practice, it is generally found advantageous to replace battery 25 by a suitable constant potential device such as a Zener diode circuit. The unipolar signal $a$ is shown in FIGS. 2$a$ and 3$a$ while the bipolar signal $b$ is shown in FIGS. 2$b$ and 3$b$.

Pulse generating circuit 6 includes a saturable core 28 characterized by a substantially rectangular hysteresis loop. A main winding 29, a feedback winding 30 and an output winding 31 are operatively wound on core 28. One end of main winding portion 29$b$ is connected to ground via resistance 32 and one end of main winding portion 29$a$ is connected to the collector of NPN type transistor 33, the circuit being completed to ground via the collector-to-emitter circuit of the transistor. One end of feedback winding 30 is connected to ground while the other end is connected to the base of transistor 33 via resistance 34. A diode 35 and the collector-to-emitter circuit of NPN transistor 36 are connected between the base of transistor 33 and ground, the base of transistor 33 being connected directly to the collector of transistor 36. A diode 37 is connected between the base and emitter of transistor 36.

D.C. supply circuit 8 provides direct current energy for the operation of pulse generating circuit 6. A full-wave rectifying bridge including diodes 38–41 is connected across the single-phase output wniding 4. A π filter network is connected across the output of the bridge and includes a series resistance 42, an input capacitor 43 connecting the input side of the resistance to ground, and an output capacitor 44 connecting the other side of the resistance to ground. The output from the filter circuit is connected to the common center-tap of main winding 29. Resistance 45 is of a comparatively high value and is connected between D.C. supply circuit 8 and the base of transistor 33.

Assume first that the bipolar signal $b$ applied to the base of transistor 36 is positive, i.e., positive at the base with respect to the emitter, and that transistor 36 is therefore rendered fully conductive or fully turned ON. The collector-to-emitter circuit of transistor 36 shunts the base of transistor 33 to ground and therefore transistor 33 is fully nonconductive or OFF. Under these circumstances, current flows from the D.C. supply circuit 8 through main winding portion 29$b$ and returns to ground via resistance 32 driving core 28 into one of its saturated states, for convenience referred to as negative saturation. In going toward negative saturation, the change of flux in the core induces a potential in output winding 31, but no output pulse results since diode 46 connected in series with output winding 31 is poled in a direction to block any such current flow. When core 28 is in a state of negative saturation the core is conditioned to subsequently produce a pulse.

As soon as the potential on the base of transistor 36 becomes negative, i.e., negative at the base with respect to the emitter, transistor 36 is turned OFF and, therefore, transistor 33 is rendered operative since the base of this transistor is no longer shunted to ground. Current immediately begins to flow from the D.C. supply circuit 8 into the base of transistor 33 via resistance 45. This current flow renders transistor 33 slightly conductive and permits some current flow through main winding portion 29$a$ driving core 28 toward positive saturation. The corresponding change of flux in core 28 induces a potential in feedback winding 30 which causes current to flow into the base of transistor 33 via resistance 34. The increase of current flow into the base of transistor 33 renders the transistor more conductive permitting more current to flow through winding 29$a$ and hence a still further increase in current into the base of transistor 33. This regenerative effect between main winding portion 29$a$ and feedback winding 30 very rapidly drives transistor 33 to a fully saturated ON state. The change of flux in core 28 produces a potential in output winding 31 which is in the form of a sharp rectangular pulse having a width corresponding to the time required to drive core 28 to positive saturation.

Once core 28 reaches positive saturation, there is no additional change of flux and therefore no further potential is induced in feed back winding 30, resulting in an abrupt decrease in current into the base of transistor 33. Consequently, transistor 33 is biased OFF and current flow through main winding portion 29$a$ immediately ceases. The core is subsequently driven into negative saturation by current flow from the D.C. supply circuit through main winding portion 29$b$. Once negative saturation is reached, the circuit is again conditioned to produce a pulse.

Accordingly, whenever the bipolar signal $b$, as applied to the base of transistor 36, changes polarity from positive to negative, pulse generating circuit 6 immediately produces a sharp rectangular control pulse having a predetermined energy content. In this manner, a series of control pulses are produced, each pulse corresponding to a change of polarity of bipolar signal $b$ from positive to negative. The control pulses thus produced are illustrated in FIGS. 2$c$ and 3$c$.

Control circuit 7 includes three controlled rectifiers 47, 48 and 49. The respective anodes of these controlled rectifiers are each connected to a different one of the three-phase generator output leads via conductors 18, 19 and 20, respectively. The cathodes of the controlled rectifiers are connected to one end of field winding 2, the other end of the field winding being connected to ground. The gate elements of controlled rectifiers 47–49 are connected to the positive output lead from the pulse generating circuit via resistances 50, 51 and 52, respectively. The common rectifier cathode junction is connected to the other pulse generating circuit output lead.

A characteristic of controlled rectifiers is the ability to always oppose current flow in the reverse direction, i.e., assuming conventional current flow from positive to negative and in this case from cathode to anode. A controlled rectifier also opposes current flow in the forward direction until the rectifier is fired by applying a sufficiently positive potential to the gate element. Once the rectifier has been fired, it continues to conduct current in the forward direction, regardless of whether any potential is applied to the gate element, until such time as current tends to flow through the diode in the reverse direction. A tendency of current to flow in the reverse direction commutates the rectifier and restores the condition in which the rectifier opposes current flow in both directions.

The pulse generating circuit provides an output control pulse once during every 120 electrical degrees under normal circumstances. This output pulse is applied to each of the gate elements of the three controlled rectifiers 47–49. This pulse, however, fires only one of the controlled rectifiers, the rectifier having the most positive potential applied to its anode. Frequently, the control pulse occurs when the anodes of two of the controlled rectifiers are positive and therefore two of the controlled rectifiers would tend to fire. The common cathode connection, however, immediately assumes the higher positive potential and therefore current tends to flow in the reverse direction through the controlled rectifier connected to the lower positive potential, thereby immediately commutating this rectifier. Therefore, a single control pulse will fire only one of the three controlled rectifiers. Since the control pulses appear once during every 120 electrical degrees, the controlled rectifiers are fired in sequence, each of the three rectifiers being conductive for a 120 degree portion of the 360 electrical degrees.

Any of controlled rectifiers 47–49, once fired, remains conductive until the next controlled rectifier is fired, even though the anode potential may go negative. The reason for this is that the controlled rectifiers are supplying current to a highly inductive field winding load having a considerable current lag. Accordingly, current tends to flow through the controlled rectifier in the forward direction even though the line potential has reversed and therefore the rectifier does not commutate until the next rectifier is fired.

When one of the controlled rectifiers is fired, current flows from one of the generator output leads, through the rectifier, and through the field winding to ground. It is significant that the energy thus supplied to the field winding is taken from the positive half-cycle of the generator output potential and, as previously explained, sensing circuit 5 operates from the negative half-cycle. In this manner, the distortions introduced into lines 18–20 when the controlled rectifiers fire do not affect the sensing circuit operation.

The three-phase generator output potential is shown in broken lines in FIGS. 2d and 3d, and the potential appearing at the common cathode junction d of the controlled rectifiers is as represented by the shaded portions of the curves in FIGS. 2d and 3d. The current flow through field winding 2 is as shown in curves 2e and 3e, and is fairly constant because of the high inductance of the field winding.

The operation of the generator regulator system according to this invention can now be explained by referring to the wave shapes in FIGS. 2 and 3. Wave shapes 2a–2e correspond to a condition where the generator output potential is high and therefore the field winding current should be low in order to compensate. FIGS. 3a–3e represent the opposite situation where the output potential is low and therefore the energy supplied to the field winding should be high in order to compensate.

Referring first to the high output potential situation described in FIGS. 2a–2e, it is to be noted that the high output potential causes a comparatively high unipolar signal a across resistance 24 and battery 25. The signal appearing directly across resistance 24 is the bipolar signal b illustrated in FIG. 2b, and is the signal applied to the input of the pulse generating circuit. The average value of this bipolar signal varies directly in accordance with the generator output potential and therefore, since the generator output potential is high, a larger portion of the bipolar signal appears above the zero reference line. Under these circumstances, it is evident that the bipolar signal changes polarity from positive to negative relatively late in time, producing the corresponding pulses at the output of the pulse generating circuit positioned as shown in FIG. 2c. The successive pulses fire the controlled rectifiers 47–49 in sequence, each controlled rectifier in turn remaining conductive until the next succeeding rectifier is fired. Accordingly, the wave shape at point d is as shown in FIG. 2d and is positive for a substantial portion and negative for a smaller portion. Since the signal d is partly negative, the current flowing through field winding 2 which corresponds to the average value of the potential at point d, is of a relatively low value and is comparatively smooth as shown in FIG. 2e. Thus, the high output potential results in a relatively modest amount of current flow through the field winding.

Turn next to the condition where a relatively low output potential is present, and the unipolar signal a is therefore as shown in FIG. 3a. Since the unipolar signal is of a lower value, the average value of the bipolar signal b is lower and a larger portion of this signal is negative. Accordingly, the bipolar signal changes polarity from positive to negative at a much earlier time than was the case with the bipolar signal illustrated in FIG. 2b. The corresponding pulse developed by the pulse generating circuit is therefore earlier in time and therefore the controlled rectifiers are fired earlier in the half-cycle resulting in a potential at point d as shown in FIG. 3d. This potential is always positive and therefore has a much higher average value resulting in a much higher current flow through field winding 2 as shown in FIG. 3e. Thus, the low generator output potential results in a high field current tending to compensate for the low output potential.

These two examples, i.e., the under voltage example and the over voltage example, serve to illustrate the manner in which the field winding current is varied inversely with the generator output potential. Thus, the regulating circuit automatically compensates for any deviation in the value of the output potential from the desired normal value.

While an advantageous embodiment of the invention has been illustrated in detail, it is obvious that the invention has general broad applications and is therefore not limited to the specific embodiment shown. The scope of this invention is pointed out more particularly in the appended claims.

What is claimed is:

1. In a system for maintaining a desired output potential level from an alternating current generator device having a control winding operative to control the output potential, the combination of a sensing circuit for deriving from the output potential a bipolar signal of changing polarity having an average value related to the output potential; pulse generating means for generating a series of narrow, rectangular-shaped time-spaced pulses from said bipolar signal, said pulses being automatically advanced in time as the output potential decreases and retarded in time as the output potential increases; and control circuit means connected to energize the control winding and operative in accordance with said time-spaced pulses to provide increased energy as the time-spaced pulses advance and decreased energy as the time-spaced pulses retard.

2. A system in accordance with claim 1 wherein said sensing circuit is operative from one half-cycle of output potential and said control circuit is operative to energize the control winding during the other half-cycle by passing current from the generator output through the control winding.

3. In a system for controlling the output potential of an alternating current generator having a control winding operative to vary the output potential, the combination of a sensing circuit including rectifying means for rectifying the negative half-cycles of the output potential to derive a unipolar signal, and circuit means for changing the zero reference potential of said unipolar signal to derive a bipolar signal; a pulse generator connected to receive said bipolar signal and operative to provide a series of pulses each of predetermnied energy content, a pulse occurring whenever said bipolar signal changes from a positive to a negative polarity; controlled rectifier means connected between the generator output and the control winding to energize the control winding in accordance with the time displacement of said pulses, said controlled rectifier means being connected to fire only during positive half-cycles of the output potential.

4. In a system for maintaining a desired level of output potential from a polyphase alternating current generator having a control winding to control the level of output potential, the combination of a sensing circuit connected to sense the generator output potential and including means for deriving a unipolar signal from the output potential, and means for mixing a constant potential with said unipolar signal to derive thereby a bipolar signal; a saturable core pulse generating circuit connected to receive said bipolar signal and operative to produce a rectangular pulse of predetermined time duration whenever said bipolar signal changes to a certain polarity; and a plurality of controlled rectifiers each connected between a different phase of the generator output potential and the control winding, each of said controlled rectifiers having a gate element so connected to receive said rectangular pulses and fire only the one of said controlled rectifiers associated with the most positive instantaneous phase potential, thereby providing a quantity of enenrgization to the control winding inversely related to the generator output potential.

5. A system in accordance with claim 4 wherein said sensing circuit derives said unipolar signal by rectifying a portion of the generator output potential during the negative half-cycle thereof and said controlled rectifiers fire only during the output potential positive half-cycles.

6. A system in accordance with claim 4 wherein said sensing circuit includes a filtering means operative to reduce, but not eliminate, the ripple in said unipolar signal.

References Cited in the file of this patent
UNITED STATES PATENTS

| | | |
|---|---|---|
| 2,740,086 | Evans et al. | Mar. 27, 1956 |
| 3,032,701 | Krausz | May 1, 1962 |